United States Patent Office 2,823,222
Patented Feb. 11, 1958

2,823,222

METHOD FOR THE PREPARATION OF N-METHYLENE-GLYCINONITRILE

Arthur R. Sexton and Edgar C. Britton, Midland, Mich., assignors to The Dow Chemical Company, Midland, Mich., a corporation of Delaware No Drawing. Application June 22, 1956
Serial No. 593,020

9 Claims. (Cl. 260—465.5)

N-methyleneglycinonitrile may be prepared according to a conventional technique wherein an alkali metal cyanide and acetic acid are incrementally and partially simultaneously added to a mixture of solid ammonium chloride and formaldehyde. Practice of the known procedure provides relatively lower yields than are commercially attractive that generally are less than about 75 percent and, in addition, requires the employment of considerable quantities of acetic acid.

It would be desirable to provide an improved method for the preparation of N-methyleneglycinonitrile that would permit manufacture of the desired product from the conventional reactant materials with substantially greater yields than those obtainable in the conventional process while effecting significant economies in the consumption of the reaction materials, and especially in the use of acetic acid.

This invention has reference to, and has for its principal objective, the attainment of this and related ends.

According to the present invention, N-methyleneglycinonitrile may advantageously be obtained with yields from the reactant materials greater than about 80 percent and frequently as high as 85 or more percent, based on the involved quantities of reactant materials, by an improved method of preparation which comprises simultaneously adding about 2 moles of formaldehyde and about 1 mole of an alkali metal cyanide to an excess proportionate quantity of an ammonium halide in aqueous solution that consists of an amount from in excess of 1 to about 2 moles, and preferably about 1.4 moles of the ammonium halide at a temperature in the range from about —20° C. and, with greater benefit, from about 0° C. to about 10° C., while maintaining the reaction mass at a pH beneath about 6 and subsequently recovering solid, substantially pure N-methyleneglycinonitrile from the reaction mass. Advantageously, the pH conditions may be maintained at the desired acidity throughout the entire reaction by acidifying the reaction mass with a water-soluble non-reactive acid material near the termination of the reaction when alkaline conditions may become impossible to avoid. Such a non-reactive acid material may beneficially be a carboxylic acid. Preferably, acetic acid is utilized for this purpose.

The reaction that occurs in the practice of the method of the present invention may be illustrated by the following chemical equation:

$$NH_4X + H_2O + CH_2O + MCN \xrightarrow{pH6} CH_2=N-CH_2-CN$$

wherein X is a halide ion that generally may satisfactorily be a chloride ion and M is an alkali metal ion, suitably from sodium. It is generally beneficial and more practical for the aqueous ammonium halide solution that is employed to be at or near saturation.

The formaldehyde and alkali metal cyanide reagents are added to the reaction mass in such a manner that its pH is naturally maintained beneath about 6 during most of the period of their incorporation. They may conveniently be added to the reaction mass for this purpose in the form of separate, relatively concentrated aqueous solutions. They are preferably added to the aqueous ammonium halide solution in such a manner that a slight excess of the formaldehyde over its stoichiometrically required 2:1 molar ratio to the alkali metal cyanide is continuously being incorporated and is present in the reaction mass during the simultaneous addition of the reagents in the course of the reaction. It is generally suitable for this excess during the addition of the reagents to be in the neighborhood of at least 5 mole percent. While total amounts of either the formaldehyde or alkali metal cyanide, or both, that are in excess of the stoichiometrically required quantities may be employed, it is generally not an advantage to do so. Such a practice does not ameliorate the yields of the desired product that may be obtained. Furthermore, the excessive quantities of the reagents that may be employed are exceptionally difficult to recover suitably from the reaction mass.

As indicated, the reaction mass may advantageously be maintained at a pH beneath about 6 by acidification near the termination of the reaction to ensure avoidance of alkaline conditions that might interfere with the desired preparation. When acetic acid is utilized as the non-reactive acid material for effecting this, the amount that is required may vary to some extent upon the concentration of the ingredients in the aqueous reaction mass. Ordinarily, an amount of the acetic acid that is as little as 0.05 mole percent, based upon the quantity of the alkali metal cyanide that is present in the reaction mass, may be satisfactory for the purpose.

Care should not only be taken to avoid a pH in the reaction mass that is higher than about 6, but also to avoid reaction temperatures that are in excess of about 10° C. At greater temperatures the desired product may be formed as an oleaginous substance which is difficult to recover. The product N-methyleneglycinonitrile may readily be isolated and recovered from the reaction mass in practice of the method of the invention by filtration, decantation or the like since it normally precipitates as a crystalline substance in the course of the reaction.

By way of further illustration, about 374.5 grams (7 moles) of a technical grade of ammonium chloride was dissolved in about 1300 grams of water and the resulting solution added to a four-neck, five-liter, brine cooled flask which was equipped with a glass stirrer, a thermometer and a pair of dropping funnels. The temperature of the ammonium chloride solution was reduced to about 3° C. after which aqueous solutions of about 10 moles of formaldehyde and 5 moles of sodium cyanide were separately added dropwise through the dropping funnels over a period of about six hours during which time the temperature of the reaction mass was maintained between about 0° C. and 3° C. The formaldehyde solution consisted of about 812 grams of a 37 percent aqueous solution of formaldehyde that had been diluted with water to a total volume of about 1 liter. The sodium cyanide solution consisted of about 249 grams of the salt in a 98.5 percent purity dissolved with water to a solution that had a total volume of about 1 liter. During the addition of the reagents, the quantity of the formaldehyde solution that was being incorporated in the reaction mass was consistently maintained at a relative volume that was about 50 milliliters more than the quantity of the sodium cyanide solution being added. After the formaldehyde addition had been completed, glacial acetic acid was added dropwise over a period of about one-half hour to maintain the pH of the reaction mass beneath about 6. A total of about 25 grams of the glacial acetic acid was required for this purpose. The reaction was terminated about two hours after the last quantity of the sodium cyanide solution had been incorporated in the reaction mass. The reaction mass was then filtered and the separated solid washed with about a liter of cold water. The solids were then dried to constant weight in a vacuum oven at a temperature of about 50° C. under a pressure that was reduced about 29 inches of mercury beneath atmospheric. About 228 grams (4.24 moles) of dry, solid N-methyleneglycinonitrile was obtained. The product, which had been obtained in a yield of about 84.5 percent, based on the reactant materials, melted at a temperature between about 128 and 129° C. and contained less than about 0.2 percent by weight of chloride ion, expressed as the ammonium salt.

The foregoing procedure was repeated several times in essentially the same manner. In each instance, a substantially pure product was obtained in yields that ranged between about 80 and 84.5 percent.

By way of comparison, when N-methyleneglycinonitrile was prepared in a conventional manner not in accordance with the present invention but pursuant to the synthesis suggested at page 355 in Adams & Langley: Gilman Organic Syntheses Coll. vol. 1, 2d ed., the greatest yield that could be achieved was about 71 percent. According to the reference, the desired product may be obtained with 61–71 percent yields by adding about 1620 grams of formaldehyde and 540 grams of ammonium chloride to an ice cooled five-liter flask that is equipped with a stirrer; cooling the mixture to 0° C.; adding 490 grams of 98 percent sodium-cyanide in 850 milliliters of water at a rate of 90 drops per minute over a six hour period while stirring the mass and maintaining it beneath 5° C.; adding 380 milliliters of glacial acetic acid at a rate of about 2 to 2.5 milliliters per minute commencing at a point about halfway through the cyanide addition, when the ammonium chloride goes into solution, so as to terminate the acid addition simultaneous with completion of the cyanide addition; continuing the stirring and cooling for one and one-half hours after incorporation of all the reaganets; and subsequently recovering the product by filtration, washing and drying. An exact duplication of the procedure set forth in the reference resulted in a product yield of about 61.5 percent. The procedure was then duplicated on a larger scale using about 4 pound-moles of formaldehyde in a 35 percent aqueous solution; 2 pound-moles of sodium cyanide; 2.8 pound-moles of ammonium chloride; and 48 pounds of glacial acetic acid for each run. The yields that were obtained in ten such scaled-up runs, each of which exactly duplicated the conditions required by the conventional procedure, were found to be between about 65.5 and 71 percent.

As is apparent, practice of the method of the invention provides a substantially pure N-methyleneglycinonitrile product in yields that are generally at least about 10 to 15 or more percent greater than those which may be obtained by conventional procedures.

What is claimed is:

1. Improved method for the preparation of N-methyleneglycinonitrile which comprises simultaneously adding about 2 moles of formaldehyde and about 1 mole of an alkali metal cyanide to an excess proportionate quantity of from more than 1 to about 2 moles of an ammonium halide in aqueous solution at a temperature from about −20° C. to about 10° C. while maintaining the reaction mass at a pH beneath about 6 and subsequently recovering N-methyleneglycinonitrile from the reaction mass.

2. Improved method for the preparation of N-methyleneglycinonitrile which comprises simultaneously adding about 2 moles of formaldehyde and about 1 mole of an alkali metal cyanide to an excess proportionate quantity of from more than 1 to about 2 moles of an ammonium halide in aqueous solution at a tempertaure from about −20° C. to about 10° C. while maintaining the reaction mass at a pH beneath about 6; then, near the termination of the reaction during the completion of the addition of said formaldehyde and alkali metal cyanide, acidifying the reaction mass with a water-soluble non-reactive carboxylic acid material to maintain the pH at the desired acidity throughout the entire reaction; and subsequently recovering N-methyleneglycinonitrile from the acidified reaction mass.

3. The method of claim 2, wherein the proportionate quantity of the ammonium halide that is employed is about 1.4 moles.

4. The method of claim 2, conducted at a temperature from about 0° C. to about 10° C.

5. The method of claim 2, wherein the formaldehyde and alkali metal cyanide are continuously added to the aqueous ammonium halide solution in such a manner that a slight excess of the formaldehyde over its required 2:1 molar ratio to the alkali metal cyanide is continuously being incorporated and is present in the reaction mass during the simultaneous addition of the reagents.

6. A method in accordance with the method set forth in claim 5, wherein the formaldehyde excess during the addition of formaldehyde and the alkali metal cyanide is in the neighborhood of at least 5 mole percent.

7. The method of claim 2, wherein the non-reactive acid material that is employed for the final acidification is acetic acid which is added to the reaction mass in the amount of at least about 0.05 mole percent, based upon the quantity of the alkali metal cyanide that is incorporated in the reaction mass.

8. The method of claim 2, wherein ammonium chloride is the ammonium halide that is employed and wherein sodium cyanide is the alkali metal cyanide that is employed.

9. The method of claim 2, wherein substantially pure N-methyleneglycinonitrile is recovered in a yield of at least about 80 percent from the acidified reaction mass.

References Cited in the file of this patent

Jay et al.: Ber. Deut. Chem., 27, pp. 59–60 (1894).
Adams et al., Organic Syntheses, Coll. vol. I, pp. 347–8 (1932).